United States Patent [19]
Rudrapatna et al.

[11] Patent Number: 5,592,470
[45] Date of Patent: Jan. 7, 1997

[54] BROADBAND WIRELESS SYSTEM AND NETWORK ARCHITECTURE PROVIDING BROADBAND/NARROWBAND SERVICE WITH OPTIMAL STATIC AND DYNAMIC BANDWIDTH/CHANNEL ALLOCATION

[75] Inventors: Ashok N. Rudrapatna, Basking Ridge; Gopal K. Jaisingh, Montville; Robert R. Miller, II, Morris Township, Morris County; Jesse E. Russell, Piscataway; Robert E. Schroeder, Morris Township, Morris County, all of N.J.

[73] Assignee: AT&T, Holmdel, N.J.

[21] Appl. No.: 361,355

[22] Filed: Dec. 21, 1994

[51] Int. Cl.$^6$ .................... H04J 3/26; H04L 5/22
[52] U.S. Cl. ............... 370/320; 348/7; 348/12; 348/13; 375/200; 370/468; 370/477; 370/907
[58] Field of Search .................... 370/18, 26, 32, 370/35, 38, 45, 50, 91, 85.13, 85.14, 95.1, 95.3, 118, 60, 60.1, 94.1, 94.2; 375/200, 201, 202, 205, 211, 212; 348/6, 7, 12, 13, 5.5

[56] References Cited

U.S. PATENT DOCUMENTS

| | | | |
|---|---|---|---|
| 5,351,240 | 9/1994 | Highsmith | 370/84 |
| 5,371,734 | 12/1994 | Fischer | 370/18 |
| 5,384,777 | 1/1995 | Ahmadi et al. | 370/85.2 |
| 5,442,659 | 8/1995 | Bauchot et al. | 375/202 |

*Primary Examiner*—Alpus H. Hsu
*Assistant Examiner*—Ricky Q. Ngo
*Attorney, Agent, or Firm*—A. G. Steinmetz

[57] ABSTRACT

A wireless broadband communication system architecture is structured to provide an array of narrowband and broadband services to an end user on demand. The bandwidth of delivery is dynamically adjusted to deliver and satisfy service requirements by utilizing the appropriate bandwidth on demand. Bandwidth-on-demand is provided in accord with the invention by rearranging spectrum allocations so that a particular band spectrum is convertibly used to accomplish different purposes depending on present allocations and active applications of the system. The communications system is designed to utilize wireless communication for end point delivery to both fixed and potable terminals. The system supplies basic telephone service, wireless ISDN service, wireless data service, wireless multimedia service and various other wireless broadband service including types of interactive and broadcast video.

28 Claims, 8 Drawing Sheets

BROADBAND WIRELESS SYSTEM AND NETWORK ARCHITECTURE PROVIDING BROADBAND/NARROWBAND SERVICE WITH OPTIMAL STATIC AND DYNAMIC BANDWIDTH/CHANNEL ALLOCATION

FIELD OF THE INVENTION

This invention relates to communication system architectures and to a particular network architecture for providing narrowband/broadband two-way point-to-multipoint services to fixed and portable terminals in high teledensity areas. It is specifically concerned with a communication system that utilizes wireless transmission and dynamically allocates channels/bandwidth for specific present applications.

BACKGROUND OF THE INVENTION

Telecommunication systems provide numerous services requiting both broadband and narrowband capabilities to the corporate and individual subscriber. These services normally require that each customer be provided with wide bandwidth communications transmission media (e.g., cable or fiber) for broadband services and with narrowband transmission media (e.g., twisted pair) for narrowband services if all needed services are to be accommodated. This hard-wired physical media-based capability is expensive to install and maintain and the associated capital may be unrecoverable if the end user decides to change the service provider after installation. These same costs may also limit system deployment if these costs become prohibitive and fail to yield profitable life cycle economics.

However, wireless systems have inherent flexibility because of their untethered nature. If the end user changes carriers, no capital is stranded, since the wireless termination device can be recovered and redeployed.

SUMMARY OF THE INVENTION

A wireless broadband communication system architecture is structured to provide an array of narrowband and broadband services on demand to an end user. The system embodied by this invention maximizes frequency reuse by a judicious combination of spread spectrum techniques and time division multiplexing, and matching service requirements with appropriate sectoring of radiant signaling energy. The bandwidth of delivery is dynamically adjusted to satisfy service requirements by providing the appropriate bandwidth needed. Bandwidth-on-demand is provided in accord with the invention by rearranging (i.e. remapping) spectrum allocation to simultaneously achieve two objectives: (1) assign users channels matched to their requirements, and (2) rearrange channel assignments to maximize spectrum utilization. The communications system is designed to utilize wireless communication for end point delivery to fixed site customer areas and portable customer terminals. The system supplies basic telephone service, wireless ISDN service, wireless data service, wireless multimedia service, and various other wireless broadband services including interactive video and broadcast video. Furthermore, the system provides signaling capability in support of all the services.

Efficient use of spectrum is achieved at various levels of the system. At one level, channel assignment is performed in response to varying demand for different classes of service. In another aspect, conduits (which are subdivisions of channels) are varied in bit rate to accommodate service bandwidth requirements as long as the channels' conduits conform to an average throughput. In yet another aspect, service bandwidth requirements are matched to channels that are divided into high, medium and low bandwidth in order to achieve spectral efficiency.

In a particular scenario making use of the invention, the communication system provides bandwidth on demand by utilizing a combination of spread spectrum technique (CDMA) and time division multiplexing (TDM) operating over a broadband spectrum that is allocated to specific channels on demand. The CDMA/TDM signal is transmitted between the system network and to a customer premise dynamic access director station. The use of CDMA/TDM along with signal compression techniques allows the use of spectrum that up until now has only supplied a few channels for a small subset of services.

Spectral efficiency is enhanced by allocating/sharing the same bandwidth/channels to differing services based on a demand schedule matched to demand patterns. In another scenario using the interface, channels are allocated to services on a demand-driven basis.

In addition the network architecture provides for a set of network servers, and signaling/control means between the servers and end user devices for providing integrated services on an end-to-end network basis.

DETAILED DESCRIPTION

System Network Topology For Wireless Network With Spectrum Allocation

Figure 1:
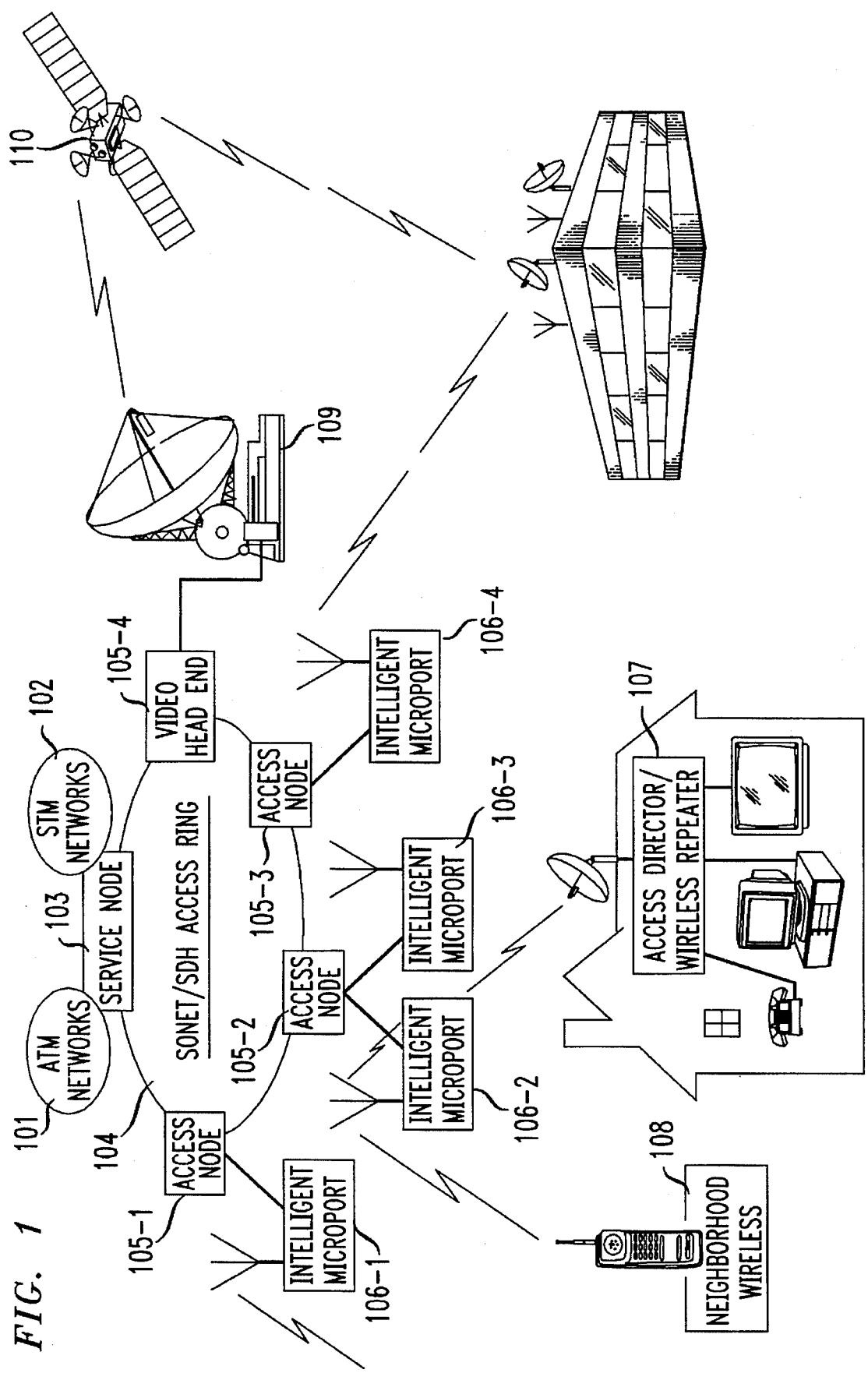
FIG. 1 is a pictorial schematic of a broadband wireless network topology embodying the principles of the invention.

FIG. 1 illustrates one version of a network topology of a broadband wireless network embodying the principles of the invention. An ATM (asynchronous transfer mode) network 101 and a STM (synchronous transfer mode) network 102 are shown connected to a service node 103 coupled in turn to a fiber based SONET/SDH access ring 104. The use of a fiber based SONET/SDH ring for access and link purposes is for illustrative purposes and is not essential for the disclosed Illustrative network. A star network using non-fiber transmission, including point-to-point microwave and/ or infrared communication could just as easily be used. Access nodes 105-1 to 105-4 couple the SONET/SDH access ring 104 to a plurality of access antennas or intelligent microports (IMP) 106-1 to 106-4. The intelligent microport 106-2 is shown connected by wireless to an access director or wireless repeater 107 at a residential customer premise. This access director/wireless repeater contains a plurality of equipment functionality [including a telephone, ISDN terminals data communication devices (e.g., PC), signaling devices/adjuncts, television/set-top boxes, multimedia worksataions, etc] supplying a broad array of narrowband/broadband services, each of which requires differing bandwidth capability. The microport 106-2 is also shown as directly serving a wireless handset 108 external to the customer premise. A microport 106-4 is shown coupling service to an industrial/office site in a manner similar to that of the residence premises. A satellite ground station 109 is shown connecting the SONET/SDH access ring 104 to a satellite 110 via access node 105-4. Communication between the SONET/SDH access ring 104 and the end user recipients is by wireless, permitting the spectrum to be partitioned into multiple channels of sufficient bandwidth as required by a particular service or application.

Figure 2:
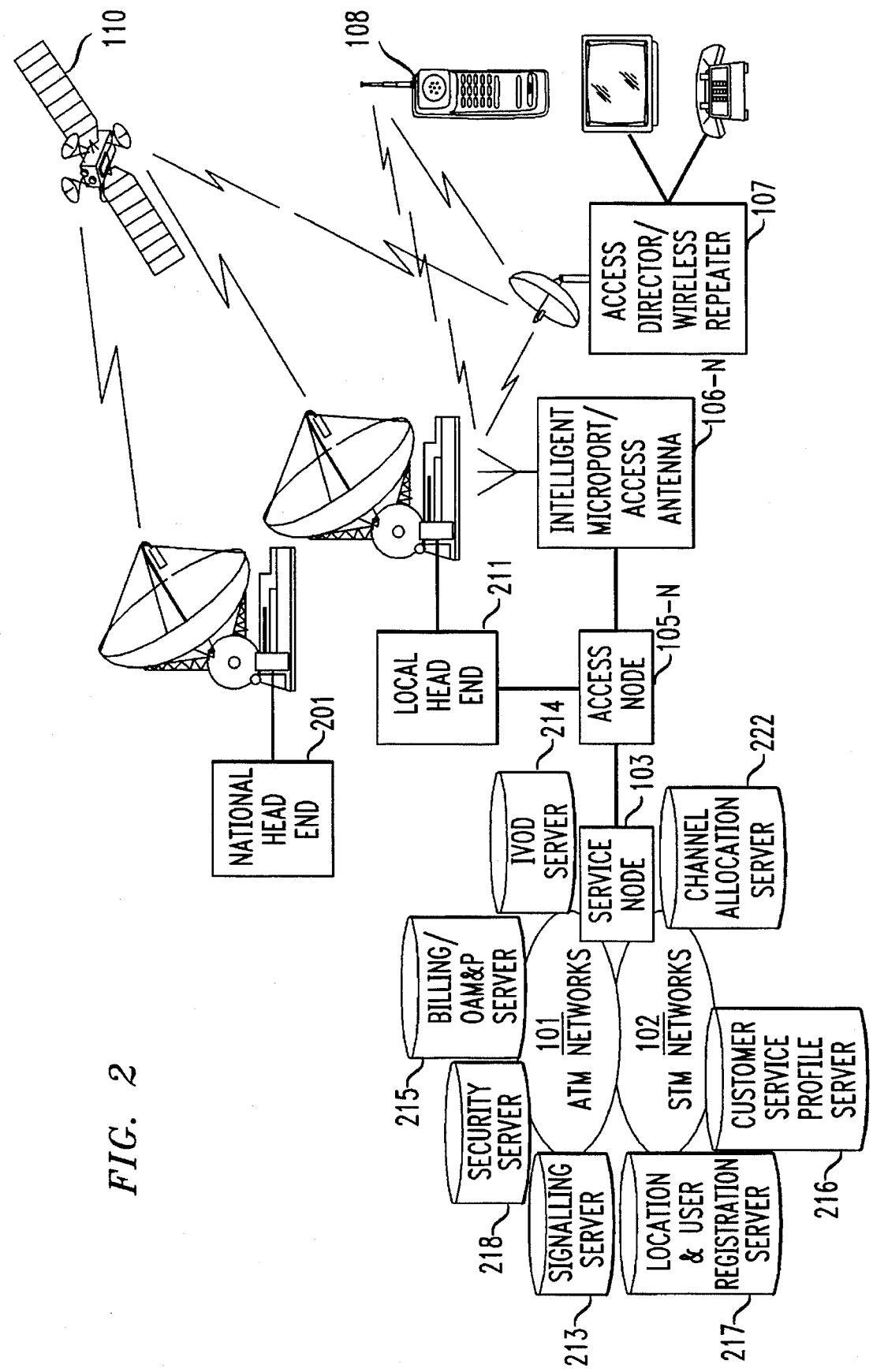
FIG. 2 is a functional schematic of a broadband wireless network architecture embodying the principles of the invention.

Functional Partitioning of the Network to Achieve Optimal Spectral Implementation An architecture suitable for the broadband wireless network is shown in the FIG. 2 in terms of the communication of the network to a particular end user. A channel allocation server 222 is provided to identify and store information regarding uses of different services over time to control static and dynamic reallocations of spectrum to individual services.

A signaling server 213 provides signaling services to end user devices: Acting as a gateway between end user devices and the network's internal signaling system; distributing control data to other servers, such as billing/OAM&P (operations, administration, maintenance, and provisioning) data to billing/OAM&P server; etc. IVOD server 214 supports IVOD services, enhancements to normal video; (e.g., pause, rewind etc. interactivity), menu driven user interface, etc. Billing/OAM&P server 215 provides for integrated billing/OAM&P to end users across all services taking into account any special service options and plans (e.g., 60 minutes of any program per month for a fixed fee). Security server 218 provides for security authentication and fraud prevention services to service providers and to end users. Customer service profile server 216 stores end user data including subscriber server preferences, etc. Location and user registration server 217, contains real time data on a user's current location and service area related data.

Signaling server 213, IVOD server 214, security server 218, billing/OAM&P server 215, customer service profile server 216, location and user registration server 217 and the channel allocation server 222 are coupled to the ATM network 101, STM network 102, and/or the service node 103. The ATM network 101 and STM network 102 are connected to a service node 103 which is in turn connected to an access node 105-N. A national headend 201 is connected to the local headend 211 via a satellite 110 and satellite ground station 109. The local headend 211 is also connected to an access node 105-N. An intelligent microport (access antenna) 106-N provides the air interface to the access director 107, which is in turn connected to the premise equipment or neighborhood wireless terminal 108 by either internal wiring or by a short air interface.

The service node 103 performs traffic grooming (e.g. aligning radio frequency/access lines to land line trunks and to channels in low, medium and high arrays to sub-channels with low, medium and high bit rate services) and further performs circuit/synchronous transfer mode (STM) and cell/asynchronous transfer mode (ATM) switching. It is also a control for feature invocation and execution. The national headend 201 originates video/multimedia broadcast information for national distribution. A local headend 211 or the access director 107 receives the video/multimedia information for local distribution. The access node 105-N adds and drops trunks to the ring/access links and provides multiplexing and demultiplexing capability. The intelligent microport 106-N implements both narrowband and broadband services by supporting a variety of multiple air interfaces. It provides both static and dynamic channel allocation to meet changing service demands by providing bandwidth on demand. The access director 107 is a gateway/repeater providing a link between the microport and customer premises equipment (both wireless 108 and wired). The neighborhood wireless terminal 108, supports a broad array of services including wireless multimedia services.

Spectrum Allocation and Partitioning

Figure 3:
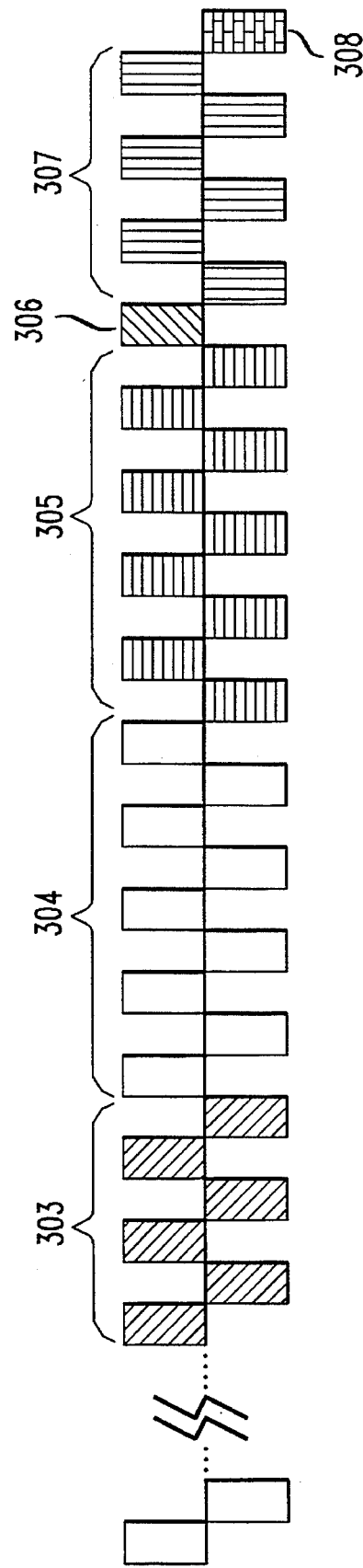
FIG. 3 is a graph of illustrative spectrum allocation in accord with the invention.

Allocation or partitioning of available spectrum in accord with the principles of the invention is shown in the FIG. 3. A service channel map shows how various channels may be apportioned to various illustrative service classes. Blocks of channels each enabling a 6 or 10 MHz bandwidth are shown arranged linearly. Two channels 301 are shown distinct and isolated from the main array. These channels are dedicated to signaling for set up of connections and control of interactive commands. They also convey data useful in provisioning, billing/OAM&P, and maintaining services to end users on an end-to-end basis across all services in an integrated manner. This data communicated between the end user terminals and the network servers (213 through 222 in FIG. 2) include user identity, destination address, authentication service request codes, billing options, OAM&P messages, security/encryption code, service priority, location, grades of service requested, etc. This data is used by the network servers to provide services to end users in accordance with service requests. Channels 301 are wireless packet signaling channels in this embodiment and are comprised of two 6 MHz channels. In addition to utilizing channel 301, channel 308 (auxiliary packet response channel) could be used for this signaling and control messages, based on the amount that such messages need to be supported. Finally in addition to the dedicated channels (301, 308) these messages could also be exchanged via the same channels (303–307) use for the bearer services.

The total array of bearer channels covers a span of 198 MHz in this illustrative array. Channels 303 are narrowband service class access downlink channels. Channels 304 are downlink broadcast video service channels. Channels 305 are downlink interactive video on demand channels. The channels designated 306 provide guard spectrum for duplex filters/attenuation rolloff used in the network. Channels 307 are uplink narrowband service class access channels. Channel 308 is an auxiliary packet response channel. In the illustrative embodiment, channels designated 301 are bounded between 2150 MHz and 2162 MHz, and channels designated 303 through 308 are bounded between 2500 MHz and 2690 MHz. In this embodiment, both the frequencies and the bandwidth of the channels can be adapted to meet different requirements.

Static Channel Assignment Process

Figure 4:
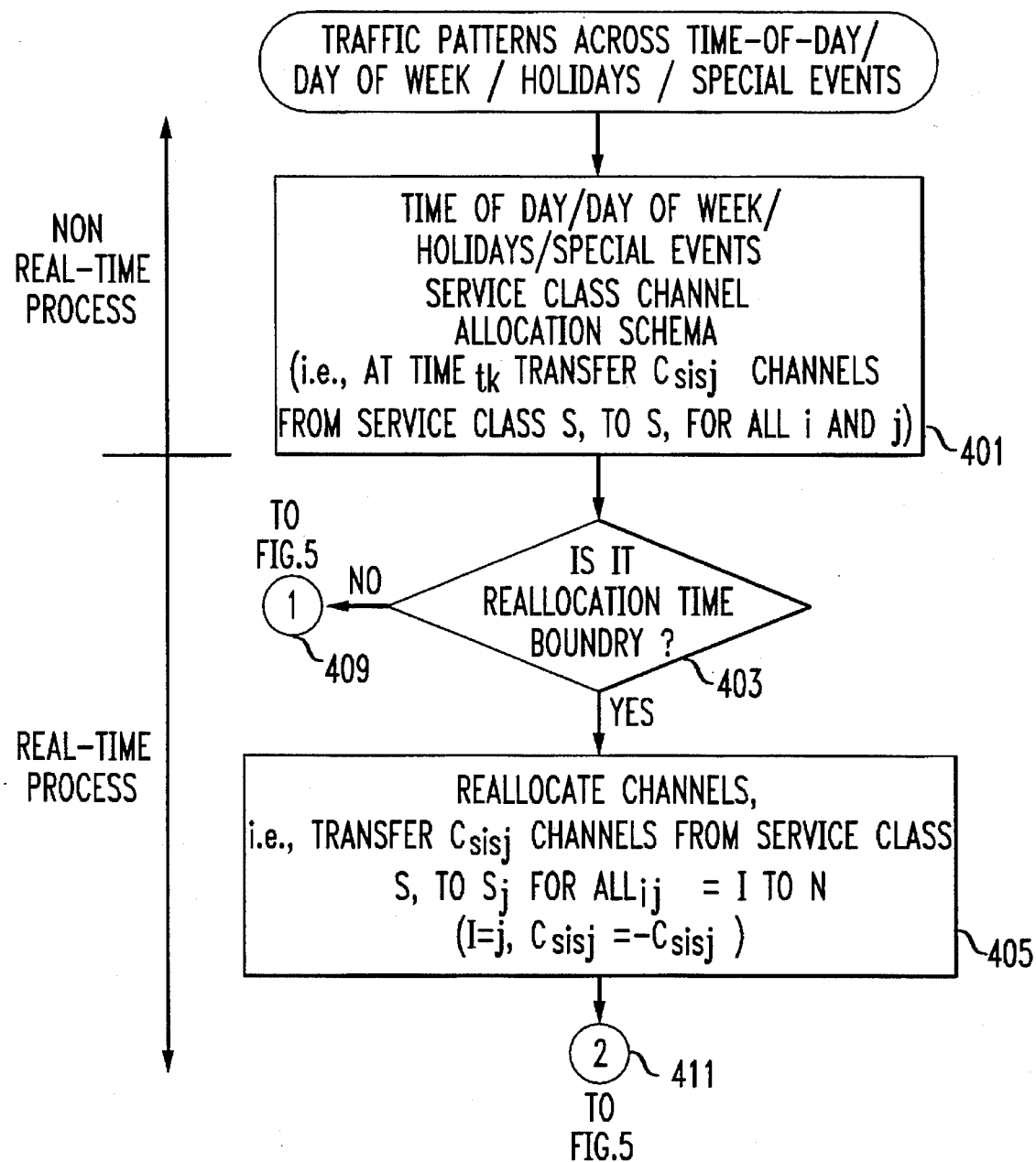
FIG. 4 is a flowchart illustrating a method of static channel assignment to meet predictable service demand variations.

FIG. 4 flowcharts a process of static channel assignment. This process is repeated periodically to conform to the channel reassignments to known customer demands at specified intervals. The process assigns channels and bandwidth on the basis of established traffic patterns on specific days and at specific times of day. The instructions of the first process block 401 monitor the time of day and the day of the week and identify the occurrences of special days that are relevant to traffic demands. The traffic demands are categorized as to specific services and are evaluated with an allocation algorithm to specify channel transfers at time $T_k$ according to: $C_{sisj}$ from service class si to service class sj. A subsequent decision block 403 evaluates the data of block 401 to determine if static channel allocation is necessary. If it is not the flow proceeds, via terminal 409, to a dynamic allocation flow process shown in the FIG. 5. If a static allocation is needed the flow proceeds to instruction block 405 which specifies the reallocation of channels to meet the expected traffic demands. In the process the channel $C_{sisj}$ is transferred from service class si to service class sj for all i and j where j=1 to N and i does not equal j and $C_{sisj}=-C_{sjsi}$. The flow then proceeds to the process of FIG. 5, via terminal 411.

Dynamic Channel Allocation Process

Figure 5:
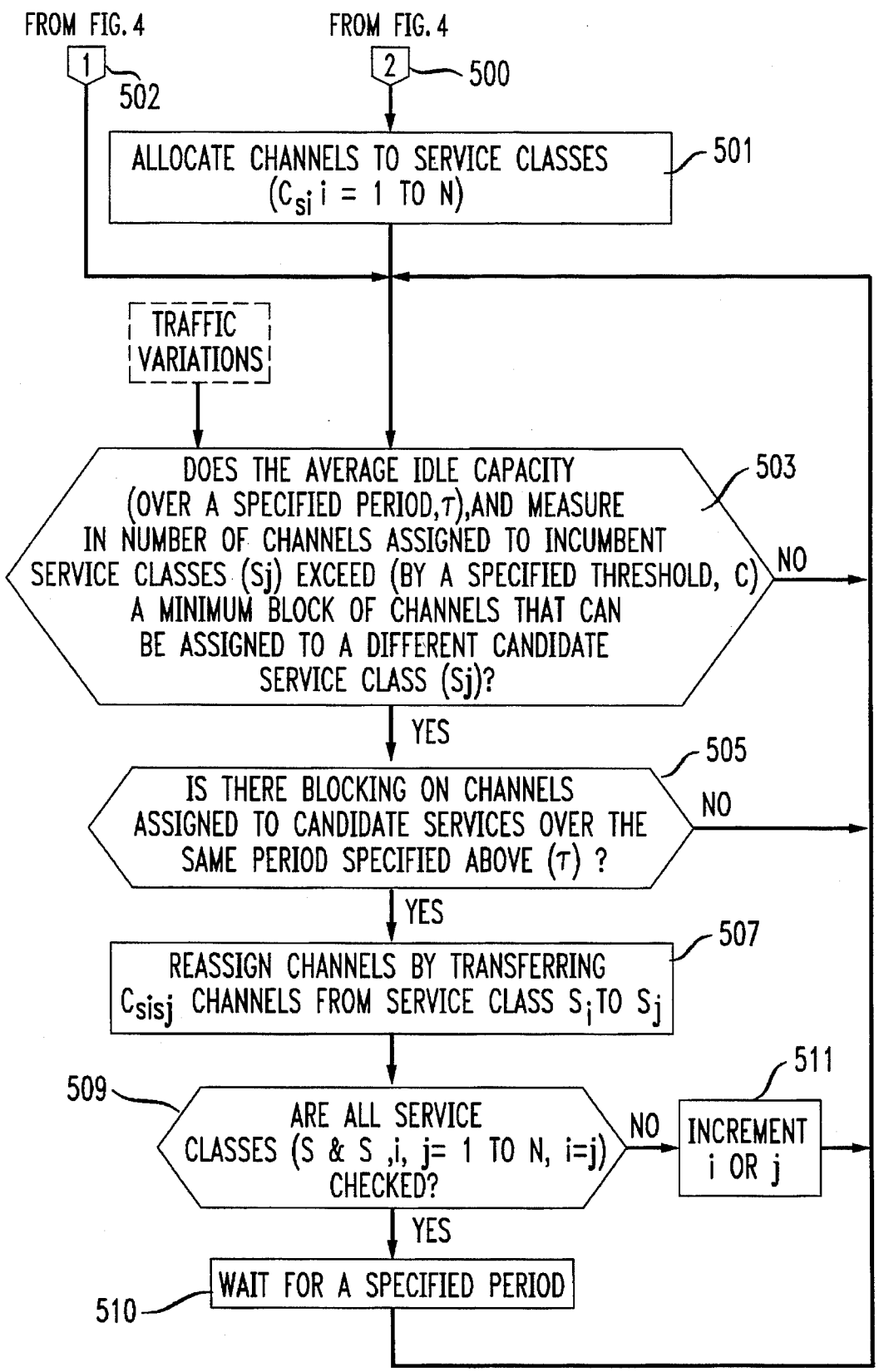
FIG. 5 is a flowchart illustrating a method of dynamic channel assignment to meet service demands.

The process of dynamic assignments is described in the flowchart shown in FIG. 5. It begins in terminal 500 which proceeds from the process shown in FIG. 4. The initial instruction block 501 defines an existing allocation of channels and bandwidth to services. The flow process begins in response to a handoff from the static process of FIG. 4, via terminal 502, at the entry to decision block 503. The instruction for block 503 determines idle channel capacity and compares the number of idle channels assigned to an incumbent service class (i.e. existing service assignments) over a specified time interval with a threshold of a minimum number of channel blocks $\Delta C$ that may within the the system be assigned to a different candidate service $S_j$. This minimum number corresponds to the transfer increment $\Delta C$ discussed herein below with reference to FIG. 7. If the available idle capacity does not exceed this threshold, the process recycles to reevaluate the number of idle channels available for such purposes.

If it is determined that a sufficient number of channels exist to satisfy the threshold requirement, the subsequent decision block 505 determines if there is blocking on channels assigned to the candidate services over the same period investigated in the evaluation of the block 503. If no such blocking exists the flow returns to the input in block 503.

If such blocking is found to exist the process flow proceeds to instruction block 507 which controls the assignment of channels to transfer channels from service class si to service class sj. At the time of transfer it is determined if all service classes si to sj have been checked and evaluated. If it has the flow proceeds to instruction block 509 which halts the flow for a specified time interval. Instruction block 509 then returns the process to the input of block 503 where the dynamic assignment process resumes.

If all such service classes have not been evaluated, the flow proceeds to instruction block 511 which increments i or j and the flow returns to the input of block 503 where the dynamic assignment process resumes.

Network Distribution of Spectrum Allocation Functions

Figure 6:
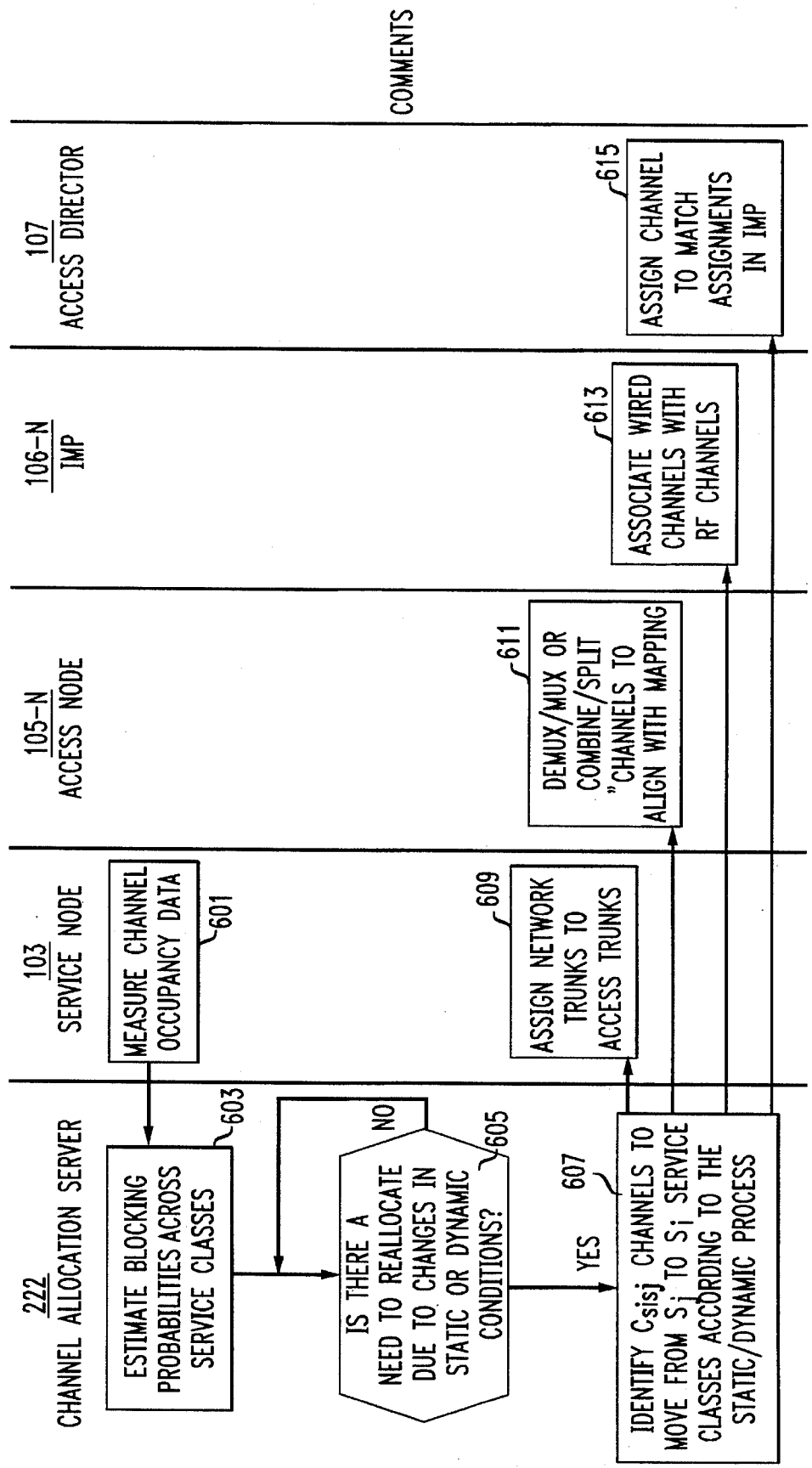
FIG. 6 is a graphical depiction of the distribution of procedures to implement static and dynamic channel assignments.

The procedures of channel assignment are distributed within the network system, as shown in FIG. 6, with instruction block 601 being performed in the service node to measure channel occupancy data. The flow proceeds to decision block 605 in the channel allocation server which in process block 603 estimates the blocking probabilities in each service classes. The flow proceeds within the channel allocation server to decision block 605, which determines if it is necessary to reallocate channel assignments due to changes in static or dynamic conditions. The process continuously recycles in this block if there is no need to reallocate spectrum. If there is a need to reallocate spectrum, the flow proceeds to instruction block 607 which identifies the channels $C_{sisj}$ that are to be moved from si to sj service classes according to the defined static and dynamic assignment processes as described in the flow charts of FIGS. 4 and 5.

The flow proceeds to instruction blocks 609, 611, 613 and 615 located in the service node, the access node, the intelligent microport and the access director, respectively. Instructions of block 609 assign network trunks to the access trunks. The instructions of block 611 demultiplex/multiples channels or combine/split channels to align mapping of blocks of channels. Instructions of block 613 associate wired channels with RF channels and instructions of block 615 assign channels to conform with assignments in the intelligent microport.

Spectrum Transfer Increments Illustrated

Figure 7:
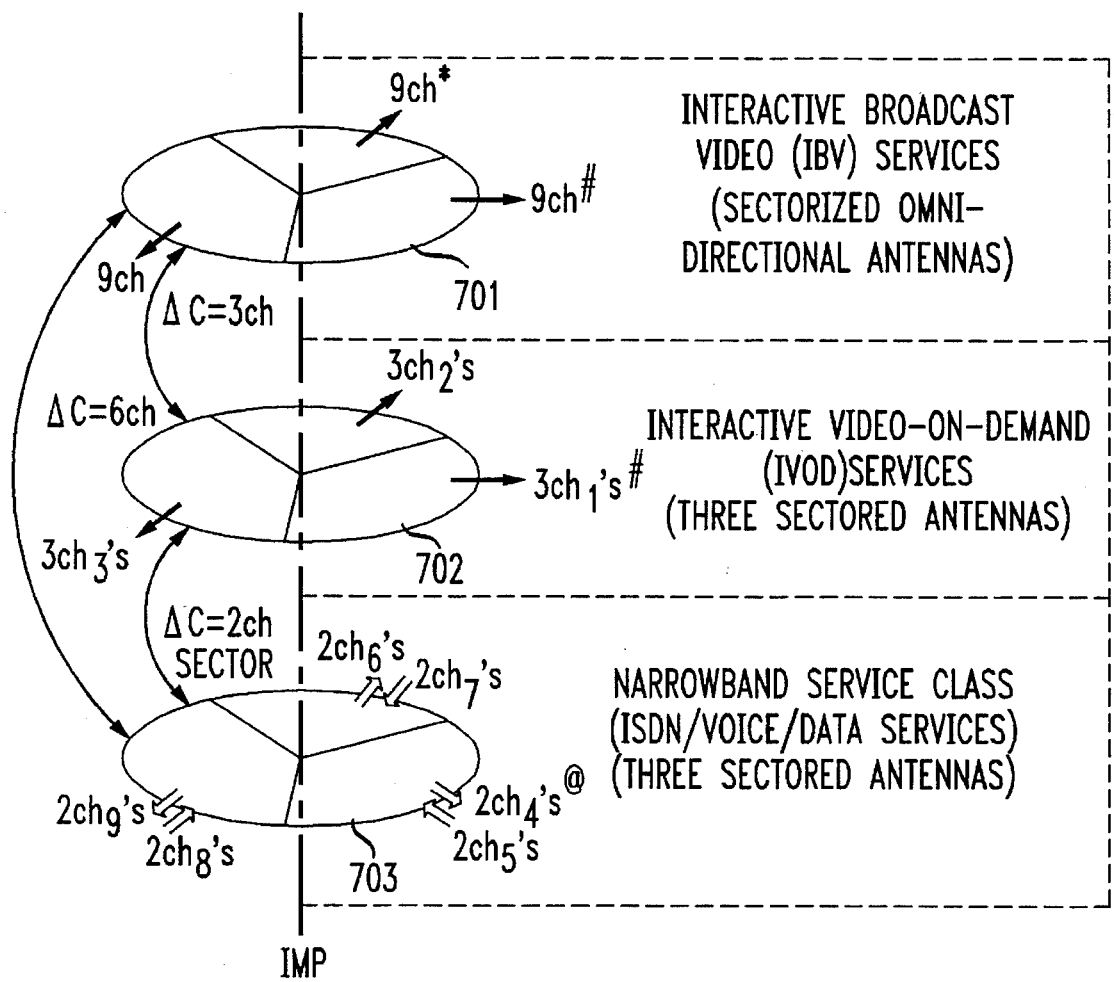
FIG. 7 is a graph of an incremental channel reassignment process across service classes.

A graphical depiction of incremental channel reassignment in the system across service classes is illustrated in the FIG. 7 in which three circular charts 701, 702 and 703 each define a different category of service classes. Each channel in the illustrative embodiment has a plurality of conduits of different bandwidth, with the conduits in each channel totaling 6 or 10 MHz. These conduits may be joined or separated and varied in bandwidth to form channels for specific service requirements. Each conduit or group of conduits is associated with supporting a specific service. These conduits are time slots in some applications (TDM) and are part of the shared spectrum band in other applications (CDMA).

The initial disk representation of disk 701, in the illustrative embodiment, represents nine channels normally assigned to interactive broadcast video services. Disk 701 is sectorized into three 120 degree sectors each of which uses the same nine channels (i.e., a sectorized omni approach). A sectorized approach is used in place of omni radio signal radiation in order to use a single antenna for all services, to minimize power requirements, and minimize heat loads on the intelligent microport. Channels that are so sectorized are in effect omnidirectional, so that channel sectorization is designed to improve signal reception quality and limit geographical area covered to the requesting subscriber. The chosen sectorization scheme represents a single sectorized antenna that will support all the service classes depicted by the three representational graphical discs 701, 702 and 703.

The channels depicted on disk 702 are normally dedicated to interactive video services and include three sectors each of which includes three channels. It is apparent that the minimum increment of channels that can be transferred between the interactive broadcast video disc 701 and the interactive video-on-demand disc 702 is three channels total.

The first and second discs 701 and 702 are one way broadcast only signals from the intelligent micro port to the access antenna of the end user.

The third disk 703 depicts the collection of ISDN, voice and data services with four channels, paired to support duplex operations (e.g. two pairs related to each of the three sectors). The transfer increment between disk 702 and 703 is two channels per sector. All the channels on the discs 702 and 703 in the original set up are different in frequency from one another. The transfer increment between the first disk 701 and the third disc 703 is six channels total.

Intelligence for executing this transfer of channels preferably (though not necessarily) appears at the intelligent microport at the network access point. For example, a change of application of channels from disk 701 to disk 703 would require a minimum of six channels total to be transferred from disk 701 to the application defined by disk 703. These channels would be filled to accommodate the new application, conduit by conduit, until the recipient channels were filled. Then additional channels (if available) would be transferred to the service requiring additional capacity.

Efficient Packing of Spectrum Into Slots For Selective Assignment

Figure 8:
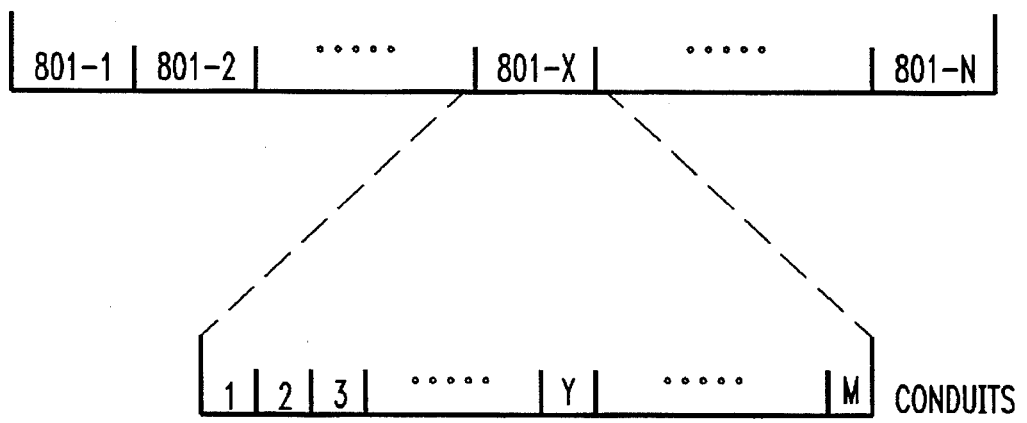
FIG. 8 shows how the spectrum is partitioned into channels and conduits.

The graph in FIG. 8 depicts a frequency spectrum divided into channels and conduits. A band of frequency which in this particular example is chosen to be 198 MHz and is shown divided into a number of contiguous frequency channels 801-1 to 801-N. One of the channels 801-X is shown in an exploded view to comprise several conduits 802-1 to 802-M which are smaller frequency bands dividing a channel. The frequency band of each channel 801 in the illustrative embodiment is either six or ten MHz. Since the bandwidth demands of different services vary, conduits may be dynamically altered in size (i.e., bandwidth) to match the requirements of the various services they support. In some instances a single conduit will suffice whereas in others several conduits may be assigned to a service. The optimum number of conduits assigned to a service is determined by the demand for that service.

Each channel is assigned to a specific service class at any given time. Services within a service class can share access to the channels assigned to that service class (i.e., use any of the conduits of that channel) on an unprovisioned (i.e., not preallocated) dynamic basis. In the allocation scheme a channel is comprised of several conduits and a conduit is the physical or logical partitioning of a channel. A conduit is the basic unit to provide service to any service class. In the IVOD and IBV service classes, the wireless modulation schema is TDM time slots corresponding to a physical partitioning of spectrum. For narrowband service classes, CDMA is the wireless modulation schema in which individual conduits are in effect logical parts of the overall channel. In each instance, a service assignment is handled by conduits wherein each conduit is assigned to serving a user of a program.

Optimizing Assignment Based on Program Content Requirements

Figure 9:
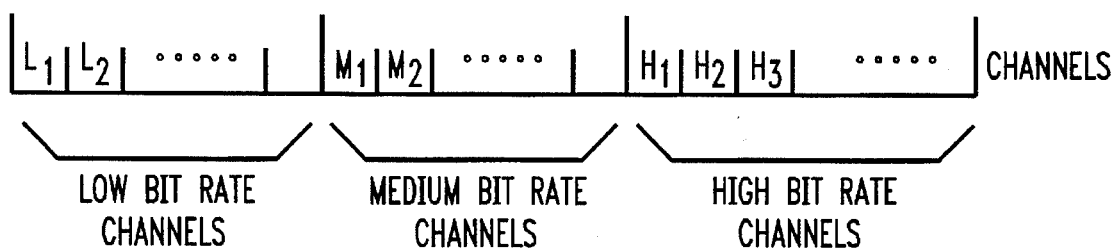
FIG. 9 illustrates a subchannel assignment scheme for servicing broadband (i.e., video) services.

A division of spectrum of channels into high (921-1, 921-2, 92 1-H), medium (911-1, 911-2, 911-M) and low (901-1, 901-2, 901-L) bit rate applications for video services is illustrated in the FIG. 9. The video content is encoded using the emerging MPEG (motion picture expert group) II standard, that operates over a broad range of encoding rates (aproximately 1.544–9 Mbps). Different program content is encoded optimally at different rates (e.g., movies at lower rates, sports at higher rates). Decoding MPEG II sources at variables rates is automatically handled in the MPEG II standard. Some channels are allocated for lower rate encoding, some for medium rate encoding and some for higher rate encoding. The number of channels assigned to each of these program types is based on the program mix required at that time. Such allocations can be preset for static allocation based on time of day and day of week or for dynamic allocation on a real time basis as program content changes are required without prior arrangement. Video programs may be groomed (i.e., channeled) to appropriate channels based on bandwidth requirements. As video programs are reassigned to different channels and conduits (i.e. channel x and conduit y) that information is conveyed to the access director by the IMP. In one illustrative embodiment it is conveyed as a mapping table.

Within a bit rate video service type, programs are encoded at variable rates (within a narrow range around the base average rate specified for the channel based on the program content requirements (e.g., based on the amount of motion in the video picture) in a manner that balances bit rate assignments across all the programs within that channel (e.g., in the 3 Mbps video channel type, one program may be given 2.7 Mbps and another one 3.3 Mbps at one time, and perhaps reversed later, keeping the average across programs to 3 Mbps at all times). To facilitate such an approach, a packetized scheme (i.e., ATM or another packet arrangement) is used because of its inherent bandwidth on demand capability.

The benefit of assigning programs in this manner i.e., higher rates for some programs and simultaneously lower rates for others by both techniques described here, viz; by grooming techniques according to encoding rate requirements and variable rate coding within the same encoding rate levels, is that this ensures a uniform and a more manageable program quality across the channels while simultaneously maximizing utilization of spectrum across the channels.

Definitions of Terms

The following definitions define terms used in the above specification:

Channel: A block of continuous spectrum assigned to a particular class of service. A channel is comprised of a plurality of conduits.

Conduit: Subportion of a channel assigned to a single user or program, for one direction of a duplex communication. More than one conduit may be combined to provide a wider band unidirectional transmission.

Sub-Channel A set of channels assigned to video services belonging to a particular rate of encoding (i.e., low, medium and high).

Interactive Broadcast Video (IBV) (TDM): This service is comprised of two parts: 1. Scheduled video content provided on a broadband (i.e., 1.5 Mbps to 6 Mbps) broadcast downlink basis potentially to all users 2. A narrowband uplink signal (<2.4 Kbps, via wireless data signaling or ISDN D channel) for service request, payment authorization, etc. IBV is provided to support services such as wireless CATV, Enhanced Pay-per-View, electronic shopping, electronic software distribution, instructional and educational television, multimedia video based information services, etc. IBV uses TDM transmission.

Interactive Video-On-Demand (IVOD) (TDM): IVOD is comprised of two parts: 1. Demand based video content transmitted on the downlink by broadband means (1.5 Mbps to 6 Mbps) only to users requesting to view that content; 2. A moderate speed uplink (<64 Kbps, via ISDN B channel or voice telephony) for service requests, payment authorization, etc. IVOD supports applications such as Video-On-Demand, networked games, interactive distance learning, telemedicine, interactive TV, multimedia video based information services etc. IVOD uses TDM transmission.

Wireless Multimedia: Wideband services at 384 Kbps (bonded 6B channels or ISDN H0 rate) supporting two-way symmetric services. Transmission is implemented by either TDM of CDMA.

Wireless Data: Supports two-way symmetric/asymmetric services (messaging, data and signaling applications up to 19.2 kbps including 0B+D service). Transmission is implemented via CDMA.

Wireless ISDN: A range of Basic rate compatible ISDN services at speeds up to 144 Kbps (1B+D to 2B+D) supporting two way symmetric services. Transmission is implemented via CDMA.

Wireless Basic Voice Telephony (CDMA) Voice service at 32, or 64, or 128 Kbps supporting two way symmetric services (including 1B and 2B services and enhanced high fidelity stereo). Transmission is implemented via CDMA.

Service Class: A portfolio of services using the same air interface that automatically lend themselves to sharing a common bandwidth within a channel across the extent of the portfolio. In our illustrative embodiment three sample service classes are defined.

1. Narrowband service class: This supports services such as basic rate ISDN, and compatible services including 0B+D, 1B+D, 2B, etc. It additionally supports all basic voice telephony (32 Kbps, 64 Kbps) and wireless data.

2. IVOD (see above)

3. IBV (see above)

We claim:

1. In a wireless broadband communication system, a method of delivering a variety of broadband/narrowband services to an end user of the system;

comprising the steps of:

coupling end user equipment to the communication system by wireless transmission media utilizing a combination of spread spectrum and time division multiplex transmission to an access antenna;

at the end user premises re-transmitting a down link spread spectrum and time division transmission from the access antenna and transmitting up link spread spectrum and time division transmission to the access antenna;

partitioning available spectrum into specific channel/conduit components aligned to specific services to the end user and allocating sub channels and conduits to provide needed bandwidth for a particular application by the steps of defining asymmetrical broadband channels and bidirectional symmetrical narrowband channels by assigning channels into specific service categories; and subdividing the channels into conduits of specified bandwidth each of which may be combined to be assigned to a specific service.

2. In a wireless broadband communication system, a method of delivering a variety of broadband/narrowband services to an end user of the system, as claimed in claim 1, wherein the step of partitioning further includes the step of selecting conduits within channels to match bandwidth requirements of services to be provided.

3. In a wireless broadband communication system, a method of delivering a variety of broadband/narrowband services to an end user of the system, as claimed in claim 2, wherein the step of partitioning further includes the step of mapping of a single service onto several conduits selected to match bandwidth requirements of that single service.

4. In a wireless broadband communication system, a method of delivering a variety of broadband/narrowband services to an end user of the system, as claimed in claim 3, wherein conduits are assigned based on modulation requirements of a service by selecting CDMA modulation for narrowband and TDM for broadband service.

5. In a wireless broadband communication system, a method of delivering a variety of broadband/narrowband services to an end user of the system, as claimed in claim 4, wherein channels are assigned to service classes to match static and variability in demand.

6. In a wireless broadband communication system, a method of delivering a variety of broadband/narrowband services to an end user of the system, as claimed in claim 5, wherein a channel is encoded by a modulation schema by utilizing CDMA for optimizing narrow band frequency reuse; and optimizing broadband applications by means of compression and by using TDM schema.

7. In a wireless broadband communication system, a method of delivering a variety of broadband/narrowband services to an end user of the system, as claimed in claim 6, maximizing channel utilization while providing uniform service quality by varying conduit bit rate to match program requirements while maintaining an average bit rate for all conduits in a channel.

8. In a communication network for providing broadband and narrowband services with a wireless connection between the network and end users; a method of allocating frequency spectrum to satisfy service bandwidth requirements of a plurality of services;

comprising the steps of:

periodically setting a re-allocation time;

static allocating of channels to meet service demand on a known predetermined allocation basis supported by time and date records at a periodic reallocation time to meet anticipated demand at that time and date;

dynamic allocating of channels to meet service demand on immediate service requests in real time by determining an idle capacity of channels, measuring a number of channels assigned to incumbent service classes, determining if a number of idle channels exceeds the channels assigned to incumbent service classes by a block number, determining channels to be assigned to a different service class; and the dynamic allocating having precedence over the static allocating.

9. In a communication network for providing broadband and narrowband services with a wireless connection between the network and end users, a method of allocating frequency spectrum to satisfy service bandwidth requirements of a plurality of services, as claimed in claim 8:

determining if there is blocking on channels to be assigned to a different service class; and reassigning unused channels to a different service class.

10. In a communication network for providing broadband and narrowband services with a wireless connection between the network and end users, a method of allocating frequency spectrum to satisfy service bandwidth requirements of a plurality of services, as claimed in claim 9:

establishing a waiting period before a subsequent dynamic allocation.

11. In a communication network for providing broadband and narrowband services with a wireless connection between the network and end users, a method of allocating frequency spectrum to satisfy service bandwidth requirements of a plurality of services, as claimed in claim 9:

reallocations of channels from one service class to another service class are in incremental integer numbers of channels.

12. In a communication network for providing broadband and narrowband services with a wireless connection between the network and end users; a method of allocating frequency spectrum in both spread spectrum and TDM transmissions to satisfy service bandwidth requirements in providing end users with a plurality of services;

comprising the steps of:

periodically setting a re-allocation time;

statically allocating channels to meet service demand on a known predetermined allocation basis supported by time and date records at the reallocation time;

dynamically allocating channels to meet service demand on immediate service requests in real time; statically and dynamically allocating channels by partitioning of the available frequency spectrum, and the dynamic allocating having precedence over the static allocating.

13. A communication network for providing broadband and narrowband services with a wireless connection between the network and end users, comprising:

an asynchronous transport mode network and a synchronous transport mode network;

a service node connected to the asynchronous transport mode network and the synchronous transport mode network and an access node which is in turn connected to a microport including an antenna for radiating radio signals to a receiving antenna of an end user;

a channel allocation server, connected to the service node, for estimating blocking probabilities across service chases and for identifying channels to be moved from one service class to another to accommodate service demands;

communication circuitry for communicating and for providing communication network routing control;

wherein the communication network apportions communication channels and conduits to specific communication services;

and wherein the service node measures channel occupancy of the channels controlled by the communication system and assigns network trunks to operate as access trunks;

the access node combining and splitting channels to conform with the mapping of services onto channels;

the microport having radiant apparatus to transmit and receive signals over air media and associating wired channels of the networks to a RF channel; and the access port connecting received wireless signals to wired and wireless equipment of the end user and transmitting wireless signals from the end user to the microport.

14. A communication network for providing broadband and narrowband services with a wireless connection between the network and end users, as claimed in claim 13, comprising:

a signaling server for providing signaling services to end user devices.

15. A communication network for providing broadband and narrowband services with a wireless connection between the network and end users, as claimed in claim 13, comprising:

a billing operations, administration, maintenance and provision server for providing integrated billing across all broadband and narrowband services to end users.

16. A communication network for providing broadband and narrowband services with a wireless connection between the network and end users, as claimed in claim 13, comprising:

a security server for providing security authentication and fraud prevention services.

17. A communication network for providing broadband and narrowband services with a wireless connection between the network and end users, as claimed in claim 13, comprising:

a customer profile server for storing end user data including subscriber preferences.

18. A communication network for providing broadband and narrowband services with a wireless connection between the network and end users, as claimed in claim 13, comprising:

a user registration server for maintaining real time data concerning a users location and service area related data.

19. A communication network for providing broadband and narrowband services with a wireless connection between the network and end users, as claimed in claim 13, comprising:

a signaling server, an Interactive Video On Demand (IVOD) server, a security server, a billing operations, administration, maintenance and provision server server, a customer service profile server and a location and user registration server, and a channel allocation server; all integrated within the system to provide integrated service across end-to-end of the network to end users across an entire portfolio of services.

20. A communication network for providing broadband and narrowband services with a wireless connection between the network and end users, as claimed in claim 13, further comprising:

the access node dividing channels into a fixed plurality of conduits, the plurality of conduits each being variable in bandwidth, with the plurality of conduits having a fixed overall bandwidth and the average bandwidth of the each conduit of the plurality of conduits remaining fixed.

21. A communication network for providing broadband and narrowband services with a wireless connection between the network and end users, as claimed in claim 13, further comprising:

a radiant apparatus comprises a sectored antenna with three sectors and radiating three levels of channels for interactive broadcast video services, interactive video on demand services and narrowband services; and the channel allocation server controlling transfers of channel assignments from one level to another.

22. A communication network for providing broadband and narrowband services with a wireless connection between the network and end users, as claimed in claim 20 or 21, further comprising:

the access node being connected to the service node with a SONET ring.

23. A communication network for providing broadband and narrowband services with a wireless connection between the network and end users, as claimed in claim 22, further comprising:

antenna means for accepting satellite signals to support broadcast video, multimedia, and information services.

24. A communication network for providing broadband and narrowband services with a wireless connection between the network and end users as claimed in claim 20 or 21, further comprising:

the access node being connected to the service node with a point-to-point microwave connection.

25. A communication network for providing broadband and narrowband services with a wireless connection between the network and end users, as claimed in claim 20 or 21, further comprising:

the access node being connected to the service node with a point-to-point infrared connection.

26. A communication network for providing broadband and narrowband services with a wireless connection between the network and end users, as claimed in claim 20 or 21, further comprising:

the access node being connected to the service node with a star connection.

27. A communication network for providing broadband and narrowband services with a wireless connection between the network and end users as claimed in claim 20 or 21, further comprising:

the access node extending available services by adding interactive services by providing interactive uplink channels.

28. A communication network for providing broadband and narrowband services with a wireless connection between the network and end users, as claimed in claim 20 or 21, further comprising:

the access node adding new services by utilizing compression techniques to pack existing services into a subset of channels to free channels for new services.

* * * * *